United States Patent
Oleson et al.

(10) Patent No.: US 11,021,255 B2
(45) Date of Patent: Jun. 1, 2021

(54) WORK-AND-DINE AIRCRAFT SEAT WITH TILT AND SHIFT ARTICULATION

(71) Applicant: Rockwell Collins, Inc., Cedar Rapids, IA (US)

(72) Inventors: Michael L. Oleson, Parkland, FL (US); Andrew J. Shutter, Parkland, FL (US); John Iossifidis, Miami, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 199 days.

(21) Appl. No.: 16/159,892

(22) Filed: Oct. 15, 2018

(65) Prior Publication Data

US 2019/0233119 A1 Aug. 1, 2019

Related U.S. Application Data

(60) Provisional application No. 62/623,975, filed on Jan. 30, 2018.

(51) Int. Cl.
*B64D 11/06* (2006.01)
*B60N 2/14* (2006.01)

(52) U.S. Cl.
CPC ............ *B64D 11/064* (2014.12); *B60N 2/143* (2013.01); *B64D 11/0644* (2014.12); *B64D 11/0648* (2014.12); *B64D 11/06395* (2014.12)

(58) Field of Classification Search
CPC ............ B64D 11/064; B64D 11/06395; B64D 11/0644; B64D 11/0648; B64D 11/0606; B64D 11/0696; B64D 11/0641; B60N 2/143; B60N 2/14; B60N 2/829; B60N 2/919; B60N 2/06; B60N 2002/924
See application file for complete search history.

(56) References Cited

U.S. PATENT DOCUMENTS

| | | | | | |
|---|---|---|---|---|---|
| 2,272,980 | A | * | 2/1942 | McLellan | A47C 1/023 297/362.14 |
| 2,409,316 | A | * | 10/1946 | Rogers, Sr. | A47C 1/03238 297/318 |
| 2,485,111 | A | * | 10/1949 | Robins | B64D 11/06 297/344.14 |

(Continued)

FOREIGN PATENT DOCUMENTS

| | | |
|---|---|---|
| WO | 2011088999 A2 | 7/2011 |
| WO | 2011088999 A3 | 10/2011 |

OTHER PUBLICATIONS

Extended EP Search Report dated Jun. 13, 2019 for European Patent Application No. 19152566.6.

*Primary Examiner* — Kyle J. Walraed-Sullivan
(74) *Attorney, Agent, or Firm* — Suiter Swantz pc llo (57) ABSTRACT

An aircraft seat with tilt-shift functionality includes a backrest frame pivotably mounted to the seat frame, the backrest frame having rollers set into its upright end that translate through slots in the seat frame and lateral slots in its forward end capable of accepting sliders attached to the seatpan. When a passenger leans backward in the seat, tilting the backrest frame backward and downward, a shift linkage below the backrest frame translates the backward tilt to a forward shift of the seatpan forward to enhance the comfort of the passenger. The aircraft seat may further be capable of longitudinal and lateral translation as well as a full 360-degree swivel.

18 Claims, 6 Drawing Sheets

(56) References Cited

U.S. PATENT DOCUMENTS

| | | | | |
|---|---|---|---|---|
| 2,611,420 | A * | 9/1952 | Diehl | A47C 7/563 297/344.14 |
| 2,655,981 | A * | 10/1953 | Nichols | B60N 2/1892 297/323 |
| 2,989,341 | A * | 6/1961 | Schliephacke | A47C 1/036 297/61 |
| 4,911,381 | A * | 3/1990 | Cannon | B64D 11/0696 244/122 R |
| 5,244,252 | A * | 9/1993 | Serber | A47C 3/0255 297/216.19 |
| 5,437,494 | A * | 8/1995 | Beauvais | B60N 2/4214 297/216.1 |
| 5,636,424 | A * | 6/1997 | Singer | B60N 2/4221 29/407.01 |
| 5,660,439 | A * | 8/1997 | Unwalla | A47C 1/03255 297/300.2 |
| 5,931,531 | A * | 8/1999 | Assmann | A47C 1/03294 297/300.2 |
| 6,106,065 | A * | 8/2000 | Carroll | A47C 1/0347 297/325 |
| 6,113,183 | A * | 9/2000 | Koch | B64D 11/06 297/162 |
| 6,334,648 | B1 * | 1/2002 | Girsberger | B60N 2/4221 297/216.19 |
| 6,742,840 | B2 | 6/2004 | Bentley | |
| 7,780,230 | B2 * | 8/2010 | Serber | B60N 2/0745 297/216.1 |
| 7,997,654 | B2 * | 8/2011 | Ferry | B60N 2/206 297/342 |
| 9,833,075 | B2 * | 12/2017 | Unwalla | A47C 1/03294 |
| 2002/0175547 | A1 * | 11/2002 | Bentley | B60N 3/004 297/316 |
| 2003/0025371 | A1 * | 2/2003 | Veneruso | B60N 2/0252 297/322 |
| 2003/0080597 | A1 * | 5/2003 | Beroth | B64D 11/0643 297/330 |
| 2005/0062324 | A1 * | 3/2005 | Shimasaki | B64D 11/064 297/312 |
| 2006/0061179 | A1 * | 3/2006 | Brendel | B60N 2/04 297/354.12 |
| 2008/0100121 | A1 * | 5/2008 | Serber | A47C 1/023 297/452.1 |
| 2009/0195046 | A1 | 8/2009 | Clausen | |
| 2012/0038196 | A1 * | 2/2012 | Lawson | B64D 11/0641 297/354.13 |
| 2013/0099539 | A1 * | 4/2013 | Fienup | A61G 15/02 297/325 |
| 2014/0001802 | A1 * | 1/2014 | Piaulet | B60N 2/002 297/217.2 |
| 2014/0159436 | A1 * | 6/2014 | Iacobucci | B60N 2/995 297/75 |
| 2014/0300161 | A1 * | 10/2014 | Beroth | B60N 2/34 297/340 |
| 2014/0300162 | A1 * | 10/2014 | Udriste | B64D 11/06 297/340 |
| 2014/0306060 | A1 * | 10/2014 | Schomacker | B64D 11/0696 244/118.6 |
| 2014/0306061 | A1 * | 10/2014 | Schomacker | B60N 2/3065 244/118.6 |
| 2015/0201758 | A1 * | 7/2015 | Serber | A47C 1/024 297/300.6 |
| 2015/0307194 | A1 * | 10/2015 | Oleson | B60N 2/002 297/217.2 |
| 2016/0206098 | A1 * | 7/2016 | Rivera | A47C 1/03294 |
| 2016/0325838 | A1 * | 11/2016 | Erhel | B60N 2/34 |
| 2017/0174345 | A1 * | 6/2017 | Muman | B64D 11/064 |
| 2017/0275003 | A1 * | 9/2017 | Erhel | B60N 2/14 |
| 2017/0313213 | A1 * | 11/2017 | Meister | B60N 2/34 |
| 2018/0105273 | A1 * | 4/2018 | Robinson | B64D 11/0605 |
| 2019/0077513 | A1 * | 3/2019 | Oleson | B64D 11/0648 |
| 2019/0127070 | A1 * | 5/2019 | Oleson | B64D 11/0641 |
| 2019/0152606 | A1 * | 5/2019 | De La Garza | B64D 11/0696 |
| 2019/0232825 | A1 * | 8/2019 | Chintapudi | B60N 2/14 |
| 2019/0233119 | A1 * | 8/2019 | Oleson | B64D 11/06395 |
| 2019/0308579 | A1 * | 10/2019 | Jouper | B60R 21/0152 |
| 2019/0359338 | A1 * | 11/2019 | Colletti | B60N 2/90 |
| 2019/0389582 | A1 * | 12/2019 | Kayyali | B64D 11/064 |
| 2020/0039651 | A1 * | 2/2020 | Oleson | B64D 11/06205 |
| 2020/0047890 | A1 * | 2/2020 | Simpson | B64D 11/0641 |
| 2020/0086997 | A1 * | 3/2020 | Suarez | B60N 2/06 |
| 2020/0101867 | A1 * | 4/2020 | Epaud | B60N 2/206 |
| 2020/0101873 | A1 * | 4/2020 | Cluet | B60N 2/065 |
| 2020/0108735 | A1 * | 4/2020 | Kim | B60N 2/143 |

* cited by examiner

WORK-AND-DINE AIRCRAFT SEAT WITH TILT AND SHIFT ARTICULATION

CROSS-REFERENCE TO RELATED APPLICATIONS

The instant application claims priority under 35 U.S.C § 119 to U.S. provisional patent application Ser. No. 62/623,975, filed Jan. 30, 2018. Said provisional patent application Ser. No. 62/623,975 is herein incorporated by reference in its entirety.

BACKGROUND

Aircraft seats may be made to recline, whereby the angle between the backrest portion of the seat (e.g., which supports the back, neck and head regions of the passenger occupying the seat) and the seatpan (e.g., which supports the hips and torso) increases. However, the backrest and seatpan portions may remain in substantially the same relative positions to each other during recline operations, which may not provide for optimal passenger comfort.

SUMMARY

Broadly, embodiments of the inventive concepts disclosed herein are directed to an articulable "work-and-dine" aircraft seat with tilt-shift functionality incorporating automatic forward shifting of the seatpan in response to tilt reclining of the backrest. For example, the backrest frame of the seat may include internal rollers set into its upright end that translate downward through slots in the seat frame, as well as lateral slots in its forward end capable of accepting sliders attached to the seatpan. When a passenger leans backward in the seat, tilting the backrest frame backward and downward, a shift linkage below the backrest frame translates the backward tilt to a forward shift of the seatpan forward to enhance the comfort of the passenger. The aircraft seat may further be capable of longitudinal and lateral translation as well as a full 360-degree swivel.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

Broadly, embodiments of the inventive concepts disclosed herein are directed to a "work and dine" aircraft seat allowing the occupying passenger to work or dine with an upright posture comparable to that of a typical office chair or dining chair. To enhance the comfort of the passenger, the aircraft seat may be tilt-reclined when the passenger wishes to relax; the seatback may be spring-loaded and the degree of tilt may vary depending on the passenger's preference. The aircraft seat includes a seatpan capable of automatically shifting forward when the seatback is tilted to recline the seat. The aircraft seat may be subject to static and dynamic loading per applicable federal regulations (e.g., airworthiness standards outlined in 14 CFR Part 25) and may be equipped with a headrest for aft-facing installation in compliance with said regulations and/or technical standard orders (e.g., TSO-C127).

Figure 1:
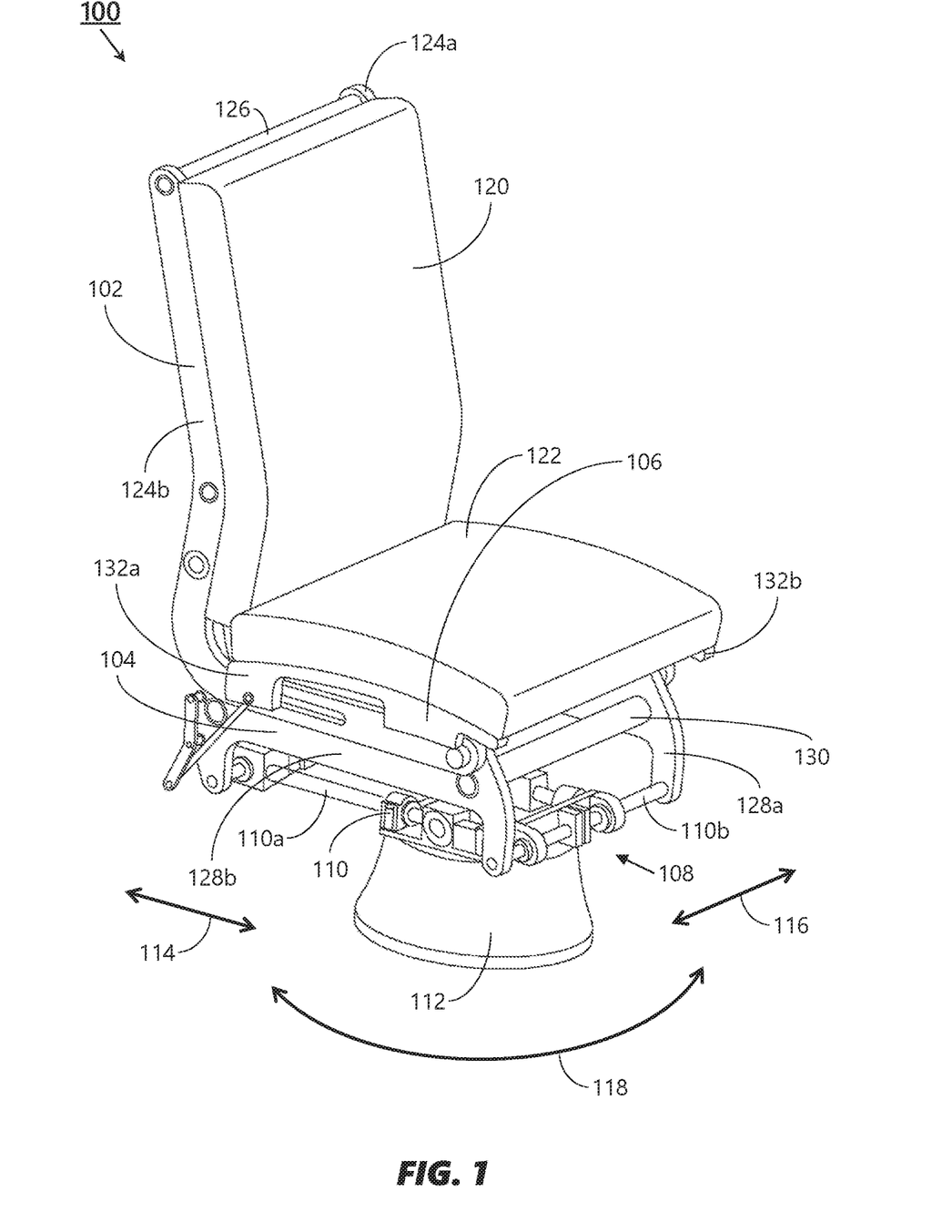
FIG. 1 is an isometric view of an exemplary embodiment of an articulable aircraft seat according to the inventive concepts disclosed herein.

Referring to FIG. 1, an exemplary embodiment of an articulable aircraft seat 100 according to the inventive concepts disclosed herein may include a backrest frame 102, a seat frame 104, and a seatpan 106. For example, the seat frame 104 may be mounted to the floor of an aircraft (e.g., within a passenger or interior cabin) via a base assembly 108 providing for articulation or movement of the aircraft seat 100 relative to the aircraft floor. The base assembly 108 may include one or more of a tracking assembly 110 and a swiveling base 112. For example, the aircraft seat 100 may be installed in a forward-facing orientation, e.g., the aircraft seat and its occupying passenger may face forward relative to the longitudinal or roll axis of the aircraft while the aircraft seat is in a default configuration associated with taxi, takeoff and landing (TTL) flight segments. The tracking assembly 110 may allow the aircraft seat 100 (via the seat frame 104) to be tracked, longitudinally (114) and/or laterally (116), relative to the default configuration. Similarly, the swiveling base 112 may allow the aircraft seat to be rotated (118) up to 360 degrees (e.g., relative to a z-axis or yaw axis of the aircraft). In some embodiments (e.g., as shown by FIG. 1), the tracking assembly 110 may be mounted to the swiveling base 112, and the swiveling base 112 mounted to the aircraft floor. Accordingly, the aircraft seat 100 may be rotated to any angle relative to its default configuration via the swiveling base 112, and then translated longitudinally or laterally (via longitudinal and lateral rails 110*a*-*b* of the tracking assembly 110) relative to the point to which the aircraft seat was rotated.

To enhance the comfort of the occupying passenger, the aircraft seat 100 may include a backrest cushion 120 attached to the backrest frame 102 and a seatpan cushion 122 attached to the seatpan 106. The seatpan cushion 122 may be partially or fully removed from the seatpan 106, e.g., for maintenance or access to life vests or other equipment or supplies stored beneath the seatpan (e.g., beneath the seatpan and above the tracking assembly 110).

The aircraft seat 100, as well as its components, may have a left and a right side (e.g., if the aircraft seat is installed in a forward-facing configuration, an outboard side and an inboard side). For example, the backrest frame 102 may include a left backrest frame member 124*a* and a right backrest frame member 124*b* connected by one or more backrest cross-members 126. Similarly, the seat frame 104 may include a left seat frame member 128*a* and a right seat frame member 128*b* connected by one or more frame cross-members 130; the seatpan 106 may include a left seatpan portion 132*a* and a right seatpan portion 132*b*.

Figure 2:
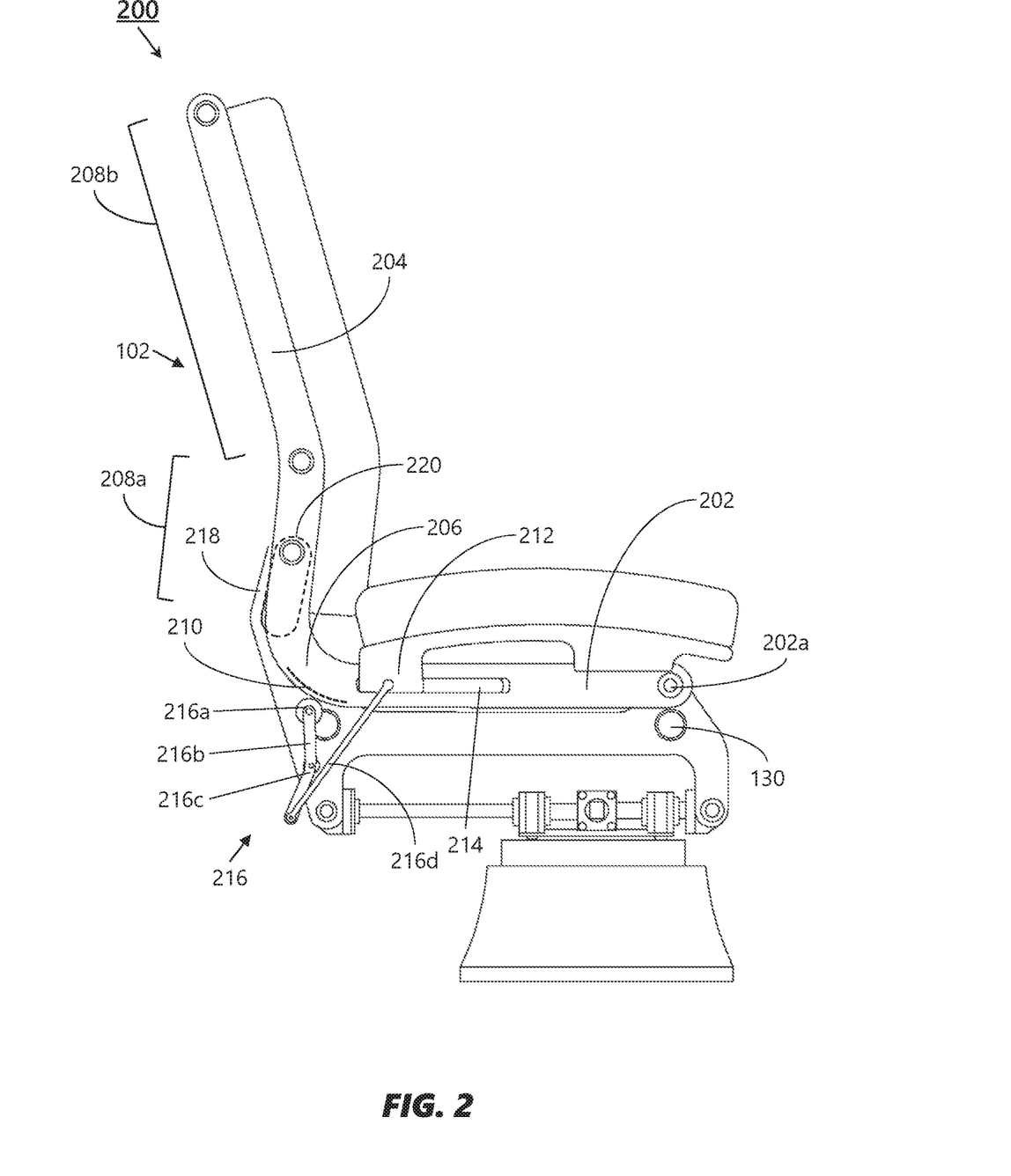
FIG. 2 is a right profile view of the aircraft seat of FIG. 1 in an upright configuration.

Referring now to FIG. 2, the aircraft seat 200 may be implemented and may function similarly to the aircraft seat 100 of FIG. 1, except that the backrest frame 102 of the aircraft seat 200 (e.g., on both the left and right sides) may include a forward end 202 and an upright end 204 connected by a curving transitional section 206. For example, the forward end 202 may be substantially horizontal, or parallel to the seat frame 104 and to the aircraft floor, when the aircraft seat 200 is in a default configuration (e.g., when not occupied by a passenger, or for use during TTL flight segments). The forward end 202 may be pivotably attached to the seat frame 104 near its forward terminal end (e.g., at a pivot point 202a proximate to the frame cross-member 130). The upright end 204 of the backrest frame 102 may rise from the transitional section 206, e.g., to support the back, neck and head of a passenger occupying the aircraft seat 100. For example, the upright end 204 may include a lower segment (208a) rising at a first angle to the seat frame (e.g., corresponding to the lumbar region of the occupying passenger) and an upper segment (208b) rising at a second angle to the upper terminal end of the backrest frame 102. The transitional section 206 may include a rail or slot 210 set into its outside edge or face.

The seatpan 106 may include a seatpan slider 212 capable of translating back and forth within a lateral slot 214 set into the forward end 202 of the backrest frame 102. The seatpan slider 212 may additionally be connected to the backrest frame 102 by a shift linkage 216. For example, the shift linkage 216 may include a linkage roller 216a capable of translating within the rail/slot 210 set into the outside face of the transitional section 206. A pivoting linkage connector 216b may be mounted to the seat frame 104, pivoting around a central pin (216c) and connecting the linkage roller 216a with a linkage rod 216d. The linkage rod 216d may connect the shift linkage 216 to the seatpan slider 212. The seat frame 104 may be substantially horizontal, e.g., parallel to the aircraft floor, terminating at the rear end of the aircraft seat 200 in an upright portion 218 rising behind and between the left-side and right-side upright ends 204 of the backrest frame 102. The upright portion 218 of the seat frame 104 may include, on its left and right outside faces, a lateral roller slot 220 set thereinto, each lateral roller slot capable of accepting a backrest roller (not shown) set into the inside faces of the upright end 204 of the backrest frame 102.

Figure 3A:
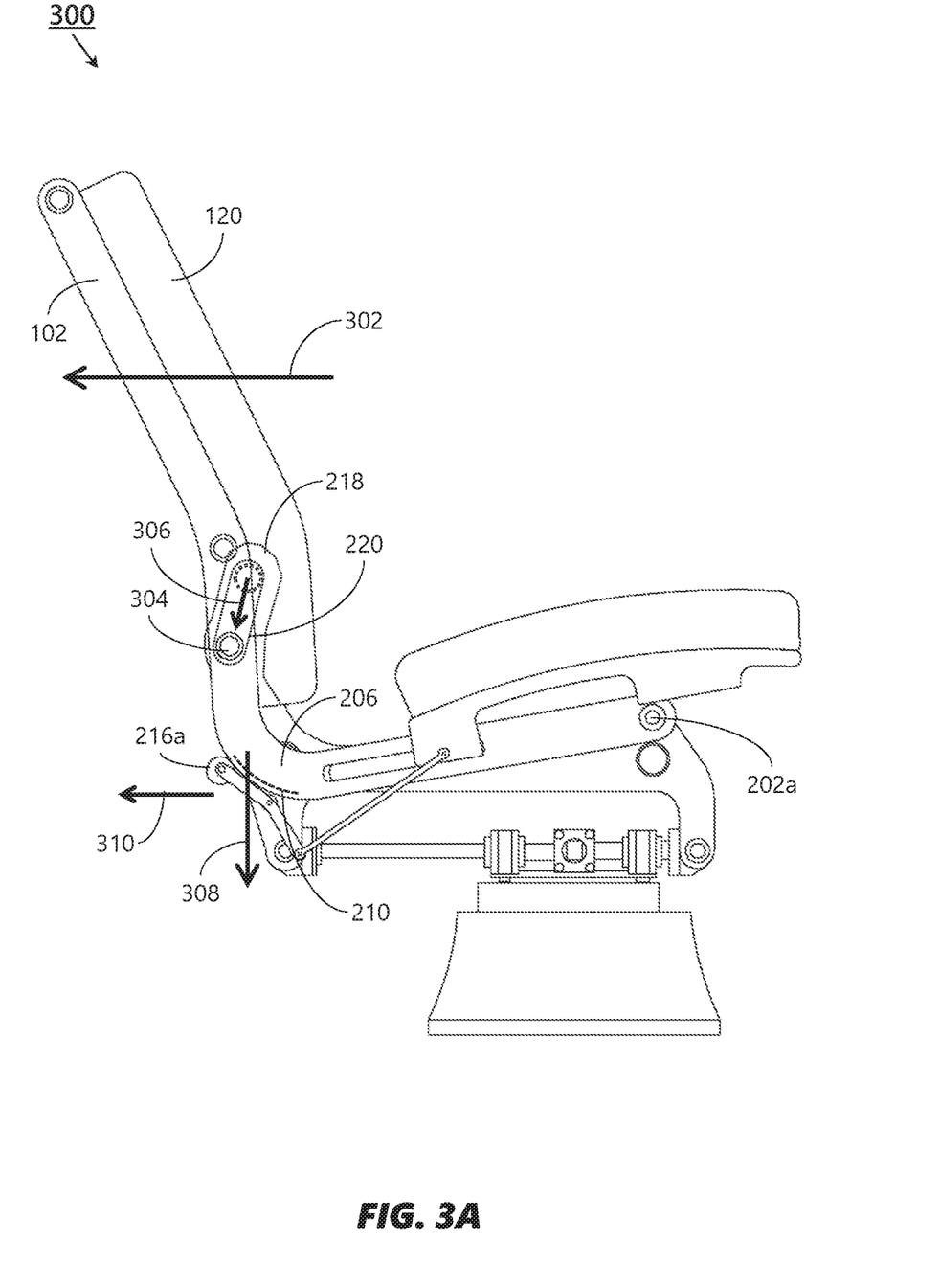
FIGS. 3A and 3B are right profile views of tilt-shift operations of the aircraft seat of FIG. 1.
Figure 3B:
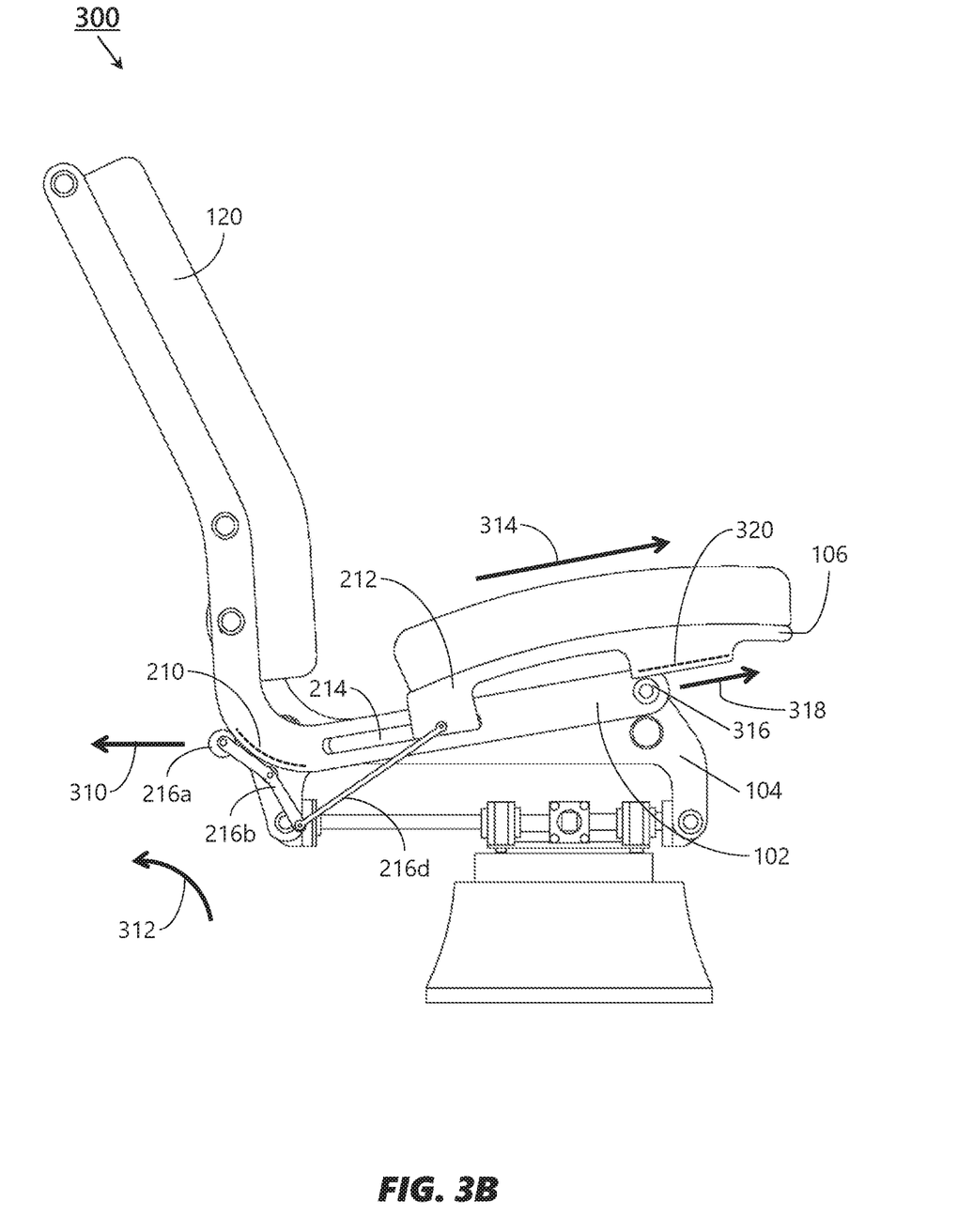

Referring to FIGS. 3A and 3B, the aircraft seat 300 may be implemented and may function similarly to the aircraft seat 200 of FIG. 2, except that the passenger occupying the aircraft seat 300 may activate the tilt/shift functionality of the seat by leaning backward (302) against the backrest frame 102 and backrest cushion 120. The passenger may manually lean backward in the aircraft seat 300, or activate the tilt/shift functionality via the actuation of manual or electronically assisted controls mounted to the aircraft seat. For example, referring in particular to FIG. 3A, when the occupying passenger leans backward (302), driving the backrest frame 102 backward and downward (e.g., relative to the pivot point 202a), the backrest rollers 304 mounted to the interior faces of the backrest frame 102 may translate downward (306) within the lateral roller slots 220 set into the upright portion 218 of the seat frame 104. The backrest frame 102, pivotably mounted to the seat frame 104 near the forward terminal end, may be driven downward (308) as well as backward (306). The downward motion (308) of the backrest frame 102, particularly the transitional section 206, may cause the linkage roller 216a to translate backward (310) along its corresponding slot 210 in the outside face of the transitional section.

Referring to FIG. 3B, the backward translation (310) of the linkage roller 216a within its corresponding rail/slot 210 may cause the linkage connector 216b to pivot (312), driving the linkage rod 216d forward. Similarly, the seatpan slider 212 may be translated forward by the linkage rod 216d within the lateral slot 214, driving the seatpan 106 forward (314) with it. The forward translation 314 of the seatpan may similarly be guided or restricted by forward rollers 316 set into the forward terminal end of the backrest frame 102. The forward rollers 316 may define, or may be disposed proximate to, the pivot point (202a, FIG. 3A) at which the backrest frame 102 is mounted to the seat frame 104. The forward rollers 316 may translate forward (318) within a corresponding slot (320) set into the seatpan 106; e.g., the rear terminus of the slot 320 may correspond to the forward terminus of the lateral slot 214.

The aircraft seat 300 may have a default configuration (as shown by the aircraft seat 200 of FIG. 2) wherein the backrest frame 102 is in a fully upright position, and the backrest frame 102 may be spring-loaded (e.g., via gas springs or similar actuators) such that, for example, when the occupying passenger leaves the aircraft seat 300, the backrest frame 102 and the seatpan 106 may return to the default positions shown by FIG. 2. Alternatively, the backrest frame 102 and seatpan 106 may be actuated from their default positions to a tilted/shifted position (e.g., as shown by FIGS. 3A and 3B), remaining in a given tilted/shifted position until actively actuated to a new position.

Figure 4:
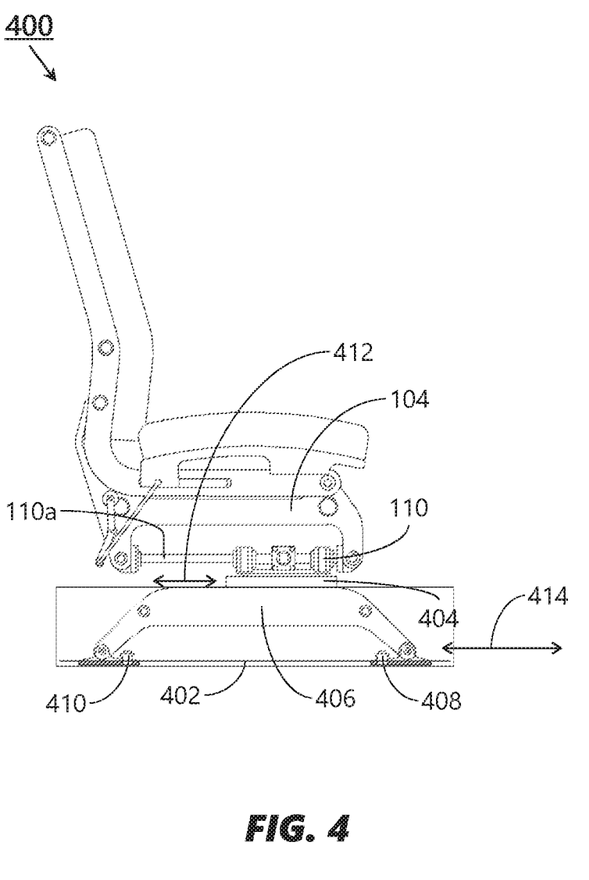
FIG. 4 is a right profile view of an aircraft seat according to the inventive concepts disclosed herein.

Referring to FIG. 4, the aircraft seat 400 may be implemented and may function similarly to the aircraft seat 300 of FIGS. 3A and 3B, except that the aircraft seat 400 may incorporate an alternative or additional base assembly via which the seat frame 104 may be mounted to the aircraft floor 402. For example, while the aircraft seat 300 may incorporate a tracking assembly (110, FIG. 1) mounted to the seat frame 104, the tracking assembly 110 mounted to a swiveling base (112, FIG. 1) and the swiveling base 112 in turn mounted to the aircraft floor, the aircraft seat 400 may incorporate a tracking assembly 110 mounted to the seat frame and a compact swiveling base (404) mounted beneath the tracking assembly. The compact swiveling base 404 may be mounted to a tracking base 406, the tracking base mounted to the aircraft floor 402 by track fastener assemblies 408, 410. For example, the track fastener assemblies 408 may be set into paired parallel tracks extending longitudinally along the aircraft floor; the tracking base 406 may be attached to the left-side and right side tracks by forward and rear track fastener assemblies 408, 410 configured to absorb dynamic energy (e.g., in the event of a crash or other impact) and deform to decelerate the forward movement of the aircraft seat 400. In this way, the aircraft seat 400 may be capable of additional longitudinal tracking (412; e.g., above and beyond that provided by the longitudinal rails 110a of the tracking assembly 110) relative to the tracking base 406. In some embodiments, the aircraft seat 400 may be capable of longitudinal tracking (414) relative to the tracks in the aircraft floor 402.

Figure 5:
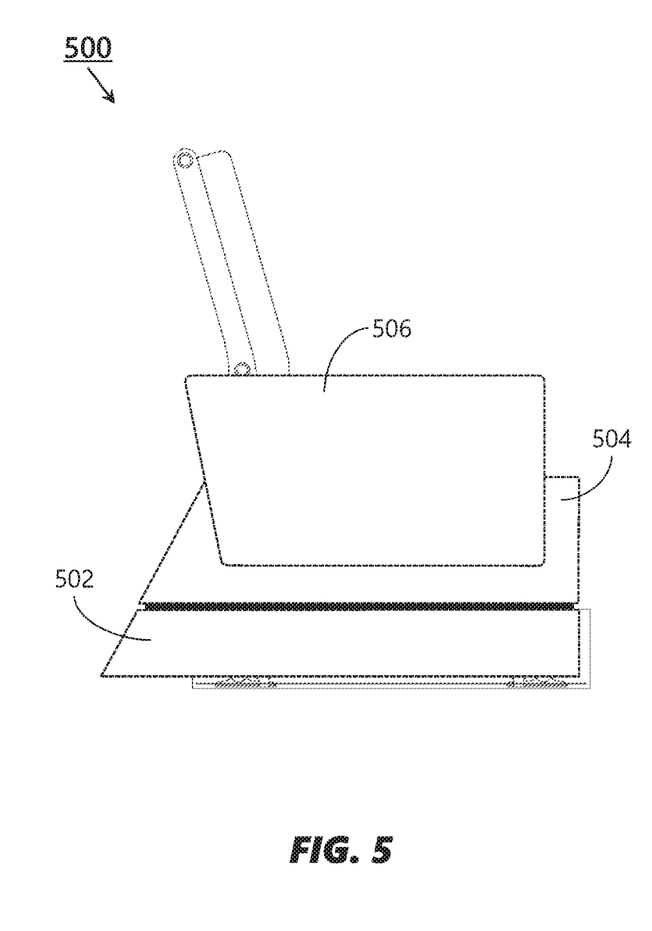
FIG. 5 is a right profile view of the aircraft seat of FIG. 1.

Referring to FIG. 5, the aircraft seat 500 may be implemented and may function similarly to the aircraft seat 300 of FIGS. 3A/B and the aircraft seat 400 of FIG. 4, except that the aircraft seat 500 may incorporate one or more rigid or semi-rigid shrouds 502, 504 attached to and surrounding the aircraft seat to protect or conceal the mechanicals of the aircraft seat (e.g., the shift linkage 216 (FIG. 2) or tracking assembly (110, FIG. 5)) while preserving their functionality. The aircraft seat 500 may incorporate upper lateral shrouds 506 to protect or conceal the seatpan mechanicals (106, FIG. 5) while serving as armrests for the passenger occupying the seat.

Figure 6A:
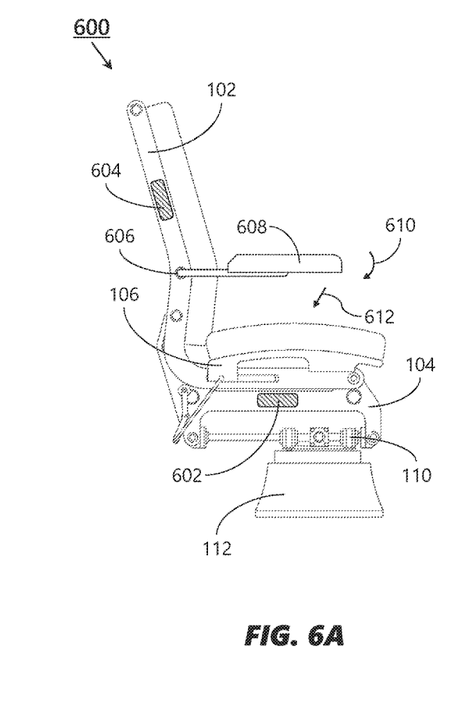
FIGS. 6A and 6B are right profile views of the aircraft seat of FIG. 1.
Figure 6B:
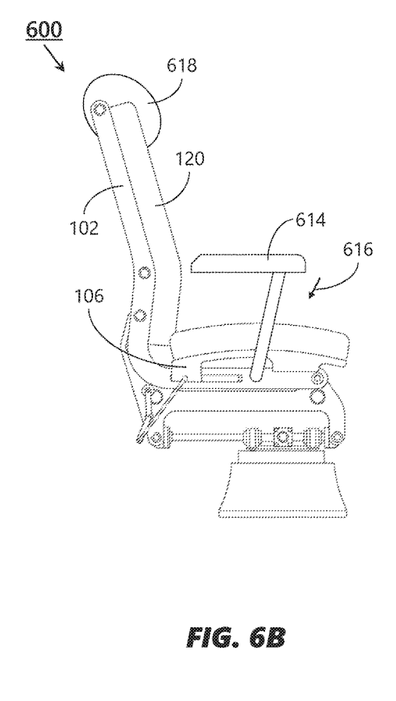

Referring to FIGS. 6A and 6B, the aircraft seat 600 may be implemented and may function similarly to the aircraft seat 300 of FIGS. 3A/B and the aircraft seat 400 of FIG. 4, except that the aircraft seat 600 may incorporate control sets to provide the passenger with manual or electronically assisted control over the functionalities of the aircraft seat. For example, a control set 602 may be mounted to the seat frame 104 to provide a seated passenger with easy access to control over the tracking assembly 110, the swiveling base 112, or the tilt-shift functionality of the backrest frame 102 and the seatpan 106. Alternatively or additionally, a control set 604 may be mounted to the backrest frame 102.

The backrest frame 102 may include armrest attachment points 606, e.g., on both the left and right sides. For example, an armrest 608 (which may include a variety of appropriate designs or shapes) may be mounted to the armrest attachment point 606. In some embodiments, the armrest 608 may pivot (610) or tilt (612) in response to the rearward/downward translation (302, FIG. 3A) of the backrest frame 102.

Referring in particular to FIG. 6B, the aircraft seat 600 may alternatively incorporate armrests 614 mounted to the forward end of the backrest frame. The armrests 614 may tilt downward (616) in concert with the downward and backward tilt (308, FIG. 3A) of the backrest frame 102. The aircraft seat 600 may further incorporate a headrest 618 (e.g., centrally positioned with respect to the backrest cushion 120) capable of pivoting with the tilt of the backrest frame 102.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. An aircraft seat capable of accommodating a passenger and having an upright configuration and at least one reclined configuration, the aircraft seat comprising:
a backrest frame having a forward end and an upright end connected by a transitional section,
the upright end including one or more backrest rollers set thereinto and the forward end including one or more lateral slots set thereinto,
a seat frame mountable to a floor of an aircraft by at least one base and having a forward portion and an upright portion,
the backrest frame pivotably mounted to the forward portion at a forward terminal end and capable of rearward articulation by the passenger to transition the aircraft seat from the upright configuration to the at least one reclined configuration,
and
the upright portion including one or more backrest roller slots configured to accommodate the backrest rollers;
a seatpan slidably mounted to the backrest frame at the forward end by one or more seatpan sliders configured to translate within the lateral slots;
and
at least one shift linkage pivotably mounted to the seat frame, the shift linkage configured to articulate the seatpan forward relative to the backrest frame in response to the rearward articulation.

2. The aircraft seat of claim 1, further comprising:
at least one forward roller attached to the seat frame proximate to the forward terminal end, the forward roller configured to rotatably translate within a forward roller slot set into the seatpan in response to the rearward articulation.

3. The aircraft seat of claim 1, further comprising:
at least one first armrest mounted to the backrest frame.

4. The aircraft seat of claim 3, wherein the at least one first armrest is configured to pivot responsive to the rearward articulation.

5. The aircraft seat of claim 3, wherein the at least one first armrest is configured to tilt in alignment with the backrest frame responsive to the rearward articulation.

6. The aircraft seat of claim 3, further comprising:
at least one second armrest mounted to the seatpan.

7. The aircraft seat of claim 1, wherein the at least one shift linkage comprises:
a linkage roller configured to, in response to the rearward articulation, translate within a linkage roller slot set into the transitional section;
a linkage rod coupled to the seatpan slider and configured to, in response to the translation of the linkage roller, translate the seatpan forward via the seatpan slider;
and
a linkage connector pivotably mounted to the seat frame, the linkage connector coupling the linkage roller to the linkage rod.

8. The aircraft seat of claim 1, wherein:
the backrest frame is configured to return the aircraft seat to the upright configuration unassisted when the aircraft seat is not occupied by the passenger.

9. The aircraft seat of claim 1, further comprising:
at least one lateral shroud attached to the seat frame and configured to protect one or more of the backrest frame, the seat frame, the forward end, and the forward portion.

10. The aircraft seat of claim 1, wherein the at least one base includes one or more of:
a tracking frame configured to permit at least one of lateral translation and longitudinal translation of the seat frame relative to the at least one base;
and
a swiveling base configured to permit rotation of the seat frame relative to a z-axis associated with the at least one base.

11. The aircraft seat of claim 10, wherein the at least one base is mounted to one or more tracks set into the floor.

12. The aircraft seat of claim 11, wherein the at least one base is configured to allow translation of the aircraft seat within the one or more tracks.

13. The aircraft seat of claim 1, wherein the backrest frame is capable of supporting at least one backrest cushion and the seatpan is capable of supporting at least one seatpan cushion.

14. The aircraft seat of claim 1, further comprising:
at least one control set configured to respond to control input associated with the passenger by adjusting one or more of the rearward articulation of the backrest frame and the forward translation of the seatpan.

15. The aircraft seat of claim 14, wherein the at least one control set is mounted to the backrest frame.

16. The aircraft seat of claim 14, wherein the at least one control set is mounted to the seat frame.

17. The aircraft seat of claim 14, wherein the at least one control set is further configured to adjust one or more of:
- a lateral translation of the seat frame relative to the at least one base;
- a longitudinal translation of the seat frame relative to the at least one base;

and
- a rotation of the seat frame relative to the at least one base.

18. The aircraft seat of claim 14, wherein the at least one control set is electrically assisted.

* * * * *